United States Patent

Kuchta et al.

[11] Patent Number: 5,938,347
[45] Date of Patent: Aug. 17, 1999

[54] BEARING LUBRICATION ASSEMBLY

[75] Inventors: Richard Kuchta, Vernon; Peter Hasiuk, Enfield, both of Conn.

[73] Assignee: Gerber Technology, Inc., Tolland, Conn.

[21] Appl. No.: 08/928,869

[22] Filed: Sep. 12, 1997

[51] Int. Cl.⁶ .................................................. F16C 33/66
[52] U.S. Cl. ........................... 384/473; 384/462; 384/465
[58] Field of Search ................................... 384/462, 465, 384/473, 474, 322

[56] References Cited

U.S. PATENT DOCUMENTS

| | | | |
|---|---|---|---|
| 2,283,871 | 5/1942 | Norelius | 384/473 |
| 3,021,182 | 2/1962 | Schnacke . | |
| 4,408,808 | 10/1983 | Redmann, Jr. et al. | 384/473 |
| 4,764,086 | 8/1988 | Jesinger | 415/112 |
| 4,784,500 | 11/1988 | Prokop | 384/462 |
| 4,988,218 | 1/1991 | Quaglia | 384/322 |
| 5,066,146 | 11/1991 | McDonner | 384/473 |
| 5,211,484 | 5/1993 | Quaglia | 384/322 |
| 5,562,348 | 10/1996 | Link | 384/474 |

Primary Examiner—Thomas R. Hannon
Attorney, Agent, or Firm—McCormick, Paulding & Huber

[57] ABSTRACT

In a bearing lubrication delivery mechanism, a primary member is supported for rotation about a first axis and defines a bore having a second axis approximately parallel to and radially offset from the first axis. A sleeve is positioned in the bore and at least two anti-friction bearings are slidably mounted on an exterior surface of the sleeve. The bearings support the sleeve in the bore for rotational motion relative to the primary member and in combination define a first and second side. The sleeve also defines a central lubricant reservoir for receiving a charge of lubricant. A fluid conduit leading to the first side of the anti-friction bearings is defined by the sleeve and an interior surface of the bore, and a radial flow path communicating with the central lubricant reservoir and the fluid conduit is defined by an inner end of the sleeve and an end wall of the bore. As the primary member rotates, the charge of lubricant in the reservoir is acted on by centrifugal force and flows through the radial flow path to the first side of the bearings. A shield is provided on the other side of the bearings and defines a gap between the shield and the sleeve past which the lubricant must flow, thereby establishing the flow rate of the lubricant through the bearings.

8 Claims, 2 Drawing Sheets

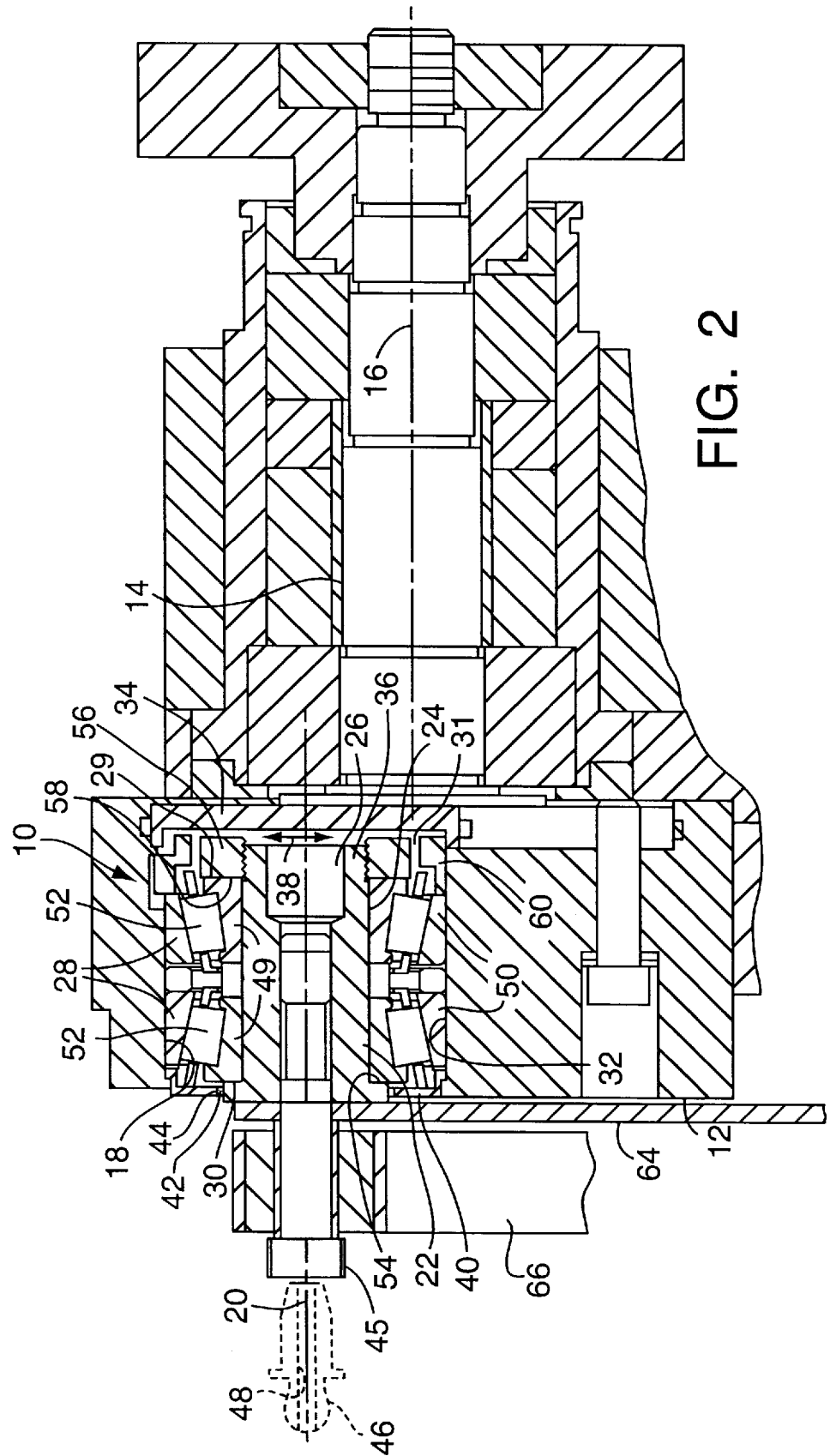

BEARING LUBRICATION ASSEMBLY

FIELD OF THE INVENTION

The present invention relates generally to bearing lubrication, and deals more particularly with a self-contained mechanism for lubricating anti-friction bearings eccentrically mounted on a first member rotatable about a first axis for supporting a second member for rotation relative to the first member about a second axis parallel to the first axis.

BACKGROUND OF THE INVENTION

Anti-friction bearings, such as ball or roller bearings, require lubrication to ensure proper operation. Often these bearings are mounted in remote or inaccessible locations where it is difficult to deliver an adequate supply of lubricant to the bearings. One known method of lubricating these remotely positioned bearings is to fill or pack them with grease prior to operating the device in which the bearings are installed. Since the grease has a tendency to flow out of the bearings during operation of the device, assemblies employing grease packed bearings usually incorporate seals mounted either directly on or adjacent to the bearings to retain the grease.

A problem sometimes encountered with bearings lubricated in the manner described above is that since the grease is retained in the bearings, it tends to degrade over prolonged periods of operation. This degradation can result in a decrease in grease viscosity and a concomitant increase in the operating temperature of the bearings. If this problem is not addressed by re-packing the bearings with fresh grease, the existing grease will continue to degrade and ultimately cause the bearings to overheat and fail. However, due to the aforementioned seals, re-packing the bearings with fresh grease can require that the bearing assembly be dismantled and the seals removed to gain access to the bearings.

Another problem associated with known grease-lubricated bearing assemblies is that in most rolling element bearings some metal-to-metal contact occurs between the rolling elements and the bearing races. This metal-to-metal contact results in the production of debris in the form of metal particles, a phenomena known to those skilled in the art as fretting. If these metal particles are not flushed from the bearings they can become lodged between the balls or rollers and the bearing races further exacerbating the fretting problem and increasing the likelihood of bearing failure. Accordingly, lubricant should be fed through the bearings at least occasionally to flush out the contaminants. However, when the grease is retained in the bearings by the seals, there is no mechanism for doing this.

Still another difficulty occurs when rolling element bearings are employed in high speed applications. In these situations, the centrifugal forces exerted by the rolling elements of the bearings on the outer bearing races can be quite high. This in turn causes an increase in bearing friction and hence bearing temperature which accelerates the deleterious effects of the problems described above. Where the bearings are eccentrically mounted to a rotating member for rotation relative thereto, the component of centrifugal force imparted by the rotating member to which the bearings are mounted is combined with the centrifugal forces generated due to the bearings own high rate of rotation, further exacerbating the difficulties described herein. This situation is often encountered in reciprocating knife cutting heads on cloth cutting machines where the knife is reciprocated by direct or indirect connection to a drive member eccentrically rotatably supported on a flywheel or other crank member.

Based on the foregoing, it is the general object of the present invention to provide a bearing lubrication delivery mechanism that overcomes the above-described drawbacks of prior art lubrication methods.

It is a further object of the present invention to provide a self-contained bearing lubrication delivery mechanism whereby bearings that are generally inaccessible during operation of the device in which they are installed, can be presented with fresh lubricant.

SUMMARY OF THE INVENTION

The present invention is directed to a self-contained bearing lubrication delivery mechanism that includes a primary member, such as a flywheel or crank member, supported for rotation about a first axis. The primary member defines a bore having a second axis parallel to and radially offset from the first axis. A sleeve having an interior lubricant reservoir for receiving a charge of lubricant is positioned in the bore and has an exterior sleeve surface upon which at least two anti-friction bearings are slidably mounted. The bearings support the sleeve in the bore for rotational motion relative to the primary member and in combination have first and second sides.

In addition to the elements described above, the present invention includes means defining a lubricant flow path from the central lubricant reservoir to the first side of the pair of anti-friction bearings and from the first side to the second side of the bearings. During operation, the primary member is driven about the first axis, and centrifugal force arising from the rotation of the primary member about the first axis and rotation of the sleeve about the second axis causes the charge of lubricant in the central lubricant reservoir to flow radially to the first side of the anti-friction bearings, thereby displacing any lubricant previously supplied to and remaining in the bearings toward the second side of the bearings.

In the preferred embodiment of the present invention a shield is positioned in the bore adjacent to the second side of the anti-friction bearings and extends around and is radially spaced from the exterior sleeve surface by an annular gap of predetermined size located between the inner edge of the shield and the exterior sleeve surface. During operation, lubricant displaced by the charge of lubricant in the reservoir flows out of the bearings through the annular gap. The gap regulates the flow of lubricant through the bearings and in the making of the shield and/or sleeve can be given the size best suited to the intended application of the bearings; with a larger gap allowing more lubricant to flow over a given time and a smaller gap allowing less lubricant to flow.

The invention also resides in the bearings being located in the space between the interior surface of the bore and the exterior surface of the sleeve and in the lubricant flow path from the first to the second sides of the anti-friction bearings comprising those portions of said space not occupied by the parts of said bearings and related spacers so that the lubricant is constrained to flow past said bearing parts. Further, an end wall of said bore is located adjacent to and spaced from the inner end of the sleeve so that the sleeve inner end and the end wall of the bore define a radial flow path therebetween providing fluid communication between the central lubricant reservoir and the first side of the bearings. As the primary member rotates, the lubricant charge in the reservoir is acted on by centrifugal force and flows through the radial flow path to the first side of the bearings. After reaching the first side of the bearings, the lubricant then flows axially through the bearings toward the second side of the bearings and through the annular gap. After passing through the annular gap, the lubricant can either be freely thrown into the surrounding atmosphere, or if this is problematic, a shielding or rotating element or elements can be provided to catch the expelled lubricant.

BRIEF DESCRIPTION OF THE DRAWINGS

These and other features, aspects, and advantages of the present invention will become better understood with regard to the following description, appended claims, and accompanying drawing where:

FIG. 2 is a cross-sectional side elevational view of the bearing lubrication delivery system of FIG. 1.

DETAILED DESCRIPTION OF THE PREFERRED EMBODIMENT

Figure 1:
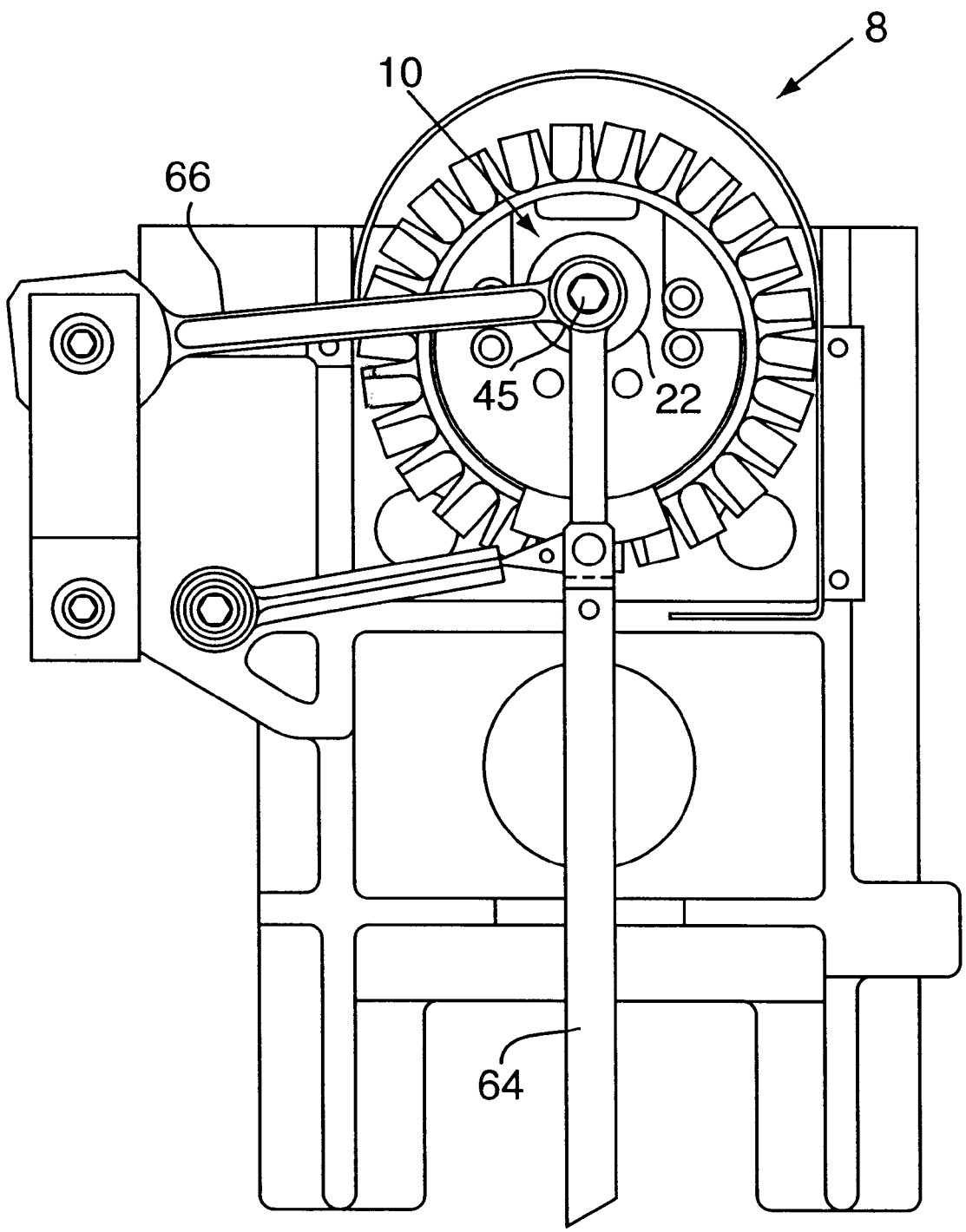
FIG. 1 is a front elevational view of a knife reciprocating mechanism having a bearing lubrication delivery system of the present invention.

Referring to FIGS. 1 and 2, the bearing lubrication delivery system of the present invention is part of a knife reciprocating mechanism 8, such as is used in a cutter head for cutting cloth and other sheet materials, and includes a primary member 12, shown as a flywheel, supported on a drive shaft 14 for rotation about a first axis 16. A bore 18 having a second axis 20 approximately parallel to and radially offset from the first axis 16 is defined by the primary member 12. A sleeve 22 having a pair of anti-friction bearings 28 slidably mounted on an exterior sleeve surface 24 is positioned in the bore 18. The pair of anti-friction bearings 28 support the sleeve 22 in the bore 18 for rotation relative to the primary member 12 and in combination have a first side 29 and a second side 30. While the pair of anti-friction bearings 28 are depicted in the illustrated embodiment as comprising tapered roller bearings, the present invention is not limited in this regard as other types of anti-friction bearings known to those skilled in the art, such as angular contact, or ball bearings, may be substituted without departing from the broader aspects of the invention.

The lubrication delivery mechanism of the present invention is indicated generally as 10 in FIG. 2 and concerns the lubrication of at least two bearings 28. In the system, the sleeve 22 defines a central lubricant reservoir 26 for receiving a charge of lubricant. A lubricant found to be particularly suitable in practicing the present invention is manufactured by Kluber and designated as Kluber Petamo GHY443 Lubricant, however, the invention is not limited in this regard as other types of lubricants known to those skilled in the art can be substituted without departing from the broader aspects of the present invention. The system 10 also provides a means defining a lubricant flow path from the central lubricant reservoir 26 to the first side 29 of the pair of anti-friction bearings 28. The flow path includes a fluid conduit 31 defined by the space between the exterior sleeve surface 24 and an interior bore surface 32. An end wall 34 of the bore 18 is located adjacent to and spaced from an inner end 36 of the sleeve 22 so that the sleeve inner end and the end wall 34 define a radial flow path 38 communicating with the central lubricant reservoir 26 and the fluid conduit 31. As the primary member 12 rotates, the lubricant charge in the reservoir is acted on by centrifugal force and flows through the radial flow path 38 and the fluid conduit 31 to the first side 29 of the pair of anti-friction bearings 28.

As shown in FIG. 2, the lubrication system also includes a shield 40 positioned in the bore 18 adjacent to the second side 30 of the pair of anti-friction bearings 28. The shield 40 extends around and is radially spaced from the exterior sleeve surface 24 by an annular gap 42 of predetermined size, defined by an inner edge 44 of the shield and the exterior sleeve surface. During operation, lubricant displaced by the charge of lubricant in the central lubricant reservoir 26 flows out of the pair of anti-friction bearings 28 through the annular gap 42. The gap 42 regulates the flow of lubricant through the bearings 28 and in the making of the shield 40 and/or the sleeve 22, can be given the size best suited to the intended application of the bearings; with a larger gap allowing more lubricant to flow over a given time and a smaller gap allowing less lubricant to flow.

As the bearing lubrication delivery mechanism 10 operates, the lubricant retained in the bearings will gradually degrade. After a predetermined interval of operating time has passed, the lubricant must be replaced. This is accomplished by removing the fastener 45 from the sleeve 22, and replacing it with a lubrication fitting 46 defining a fill passage 48, shown in broken lines in FIG. 2. When the lubrication fitting 46 is coupled to the sleeve 22, the fill passage 48 is in fluid communication with the central lubricant reservoir 26. A charge of fresh lubricant can then be pumped through the fill passage 48 and into the central lubricant reservoir 26. During operation, centrifugal force will cause the charge of lubricant to flow to the first side 29 of the bearings 28. The fresh lubricant will then force the preexisting lubricant out of the bearings and past the gap 42.

In the embodiment illustrated in FIG. 2, the pair of anti-friction bearings 28 are depicted as tapered roller bearings, each having an inner bearing race 49, slidably mounted on the exterior sleeve surface 24 of the sleeve 22, an outer bearing race 50, and a plurality of rollers 52 interposed between the inner and outer bearing races. One of the pair of inner bearing races 49 abuts a shoulder 54 defined by the sleeve 22. The shoulder 54 being located adjacent to the second side 30 of the pair of tapered roller bearings 28. In addition, an inner bearing race retainer 56 is coupled to the inner end 36 of the sleeve 22 opposite the shoulder 54 and defines abutment surface 58 for engaging the inner bearing race 49 adjacent to the first side 29 of the pair of tapered roller bearings 28 and urging the inner bearing races toward one another. In addition, an outer bearing race retainer 60 is coupled to the primary member 12 adjacent to the inner bearing race retainer 58, for urging the outer bearing races 50 of the pair of tapered roller bearings 28 toward one another.

The bearing lubrication delivery mechanism 10 described above may broadly be part of any one of a wide variety of machines wherein a pair of anti-friction bearings are eccentrically mounted and rotate relative to a primary member. The elements of the lubrication delivery mechanism 10 may therefore take on various different sizes and shapes and may be otherwise designed to suit a particular machine. In the illustrated case, the bearing lubrication delivery mechanism 10 is part of a reciprocating knife cutting head assembly for a cloth cutting machine. Accordingly, the following description of the operation of the bearing lubrication delivery mechanism will be directed to such use.

As shown in FIG. 1, the bearing lubrication mechanism 10 is part of a cutting head balancing assembly generally designated by the reference numeral 8 wherein a knife 64 is coupled for reciprocating motion to linkage 66 which in turn is coupled to the sleeve 22 via fastener 45. As the drive shaft 14, best seen in FIG. 2, causes the primary member 12 to rotate, the knife 64 is reciprocatingly driven in an upward and downward motion causing the eccentrically mounted sleeve 22 and thereby the pair of anti-friction bearings 28 to rotate relative to the primary member. The centrifugal forces imparted to the charge of lubricant arising from the combination of the eccentrically mounted bearing lubrication mechanism 10 and the rotation of the primary member 12, cause the charge of lubricant to flow radially to the first side 29 of the pair of anti-friction bearings 28. After reaching the first side 29 of the bearings 28, the lubricant then flows axially through the bearings toward the second side 30 of the bearings. Once the lubricant flows through the pair of anti-friction bearings 28, it passes through the annular gap 42 and is either expelled into the surrounding atmosphere, or if this is problematic, the spent lubricant can be captured and retained. Once the charge of lubricant contained within the central lubricant reservoir has been depleted, the fastener 45 can be removed and the lubrication fitting 46 can be coupled to the sleeve 22. A fresh charge of lubricant can then be pumped through the lubrication fitting 46 and into the central lubricant reservoir 26.

While preferred embodiments have been shown and described, various modifications and substitutions may be made without departing from the spirit and scope of the invention. Accordingly, it is to be understood that the present invention has been described by way of example, and not by limitation.

What is claimed is:

1. A bearing lubrication delivery mechanism comprising:
   a primary member supported for rotation about a first axis and defining a bore having a second axis approximately parallel to, and radially offset from said first axis;
   a sleeve positioned in said bore and defining an exterior sleeve surface and a central lubricant reservoir for receiving a charge of lubricant;
   at least two anti-friction bearings slidably mounted on said exterior sleeve surface and in combination having a first and a second side, for supporting said sleeve in said bore for rotational motion relative to said primary member;
   means defining a lubricant flow path from said central lubricant reservoir to said first side of said anti-friction bearings; and
   means for rotatably driving said primary member about said first axis thereby generating centrifugal force that is imparted to said charge of lubricant causing said lubricant to flow radially to said first side of said bearings.

2. A bearing lubrication delivery mechanism as defined by claim 1, further comprising:
   a shield positioned in said bore adjacent to said second side of said pair of anti-friction bearings, extending around and spaced radially from said exterior sleeve surface, thereby defining an annular gap of predetermined size for regulating the rate at which lubricant in said anti-friction bearings is displaced by said charge of lubricant.

3. A bearing lubrication delivery mechanism as defined by claim 1, wherein:
   each of said at least two anti-friction bearings has an inner bearing race slidably mounted on said exterior sleeve surface, an outer bearing race slidably received in said bore, and a plurality of rolling elements positioned between and in rolling communication with said inner and outer bearing races.

4. A bearing lubrication delivery mechanism as defined by claim 3, wherein said at least two anti-friction bearings are tapered roller bearings.

5. A bearing lubrication delivery mechanism as defined by claim 3, wherein:
   said exterior sleeve surface defines a shoulder adjacent to said second side of said anti-friction bearings for retaining the inner bearing race of one of said anti-friction bearings;
   an inner bearing race retainer is coupled to said sleeve adjacent to said first side of said anti-friction bearings, opposite said shoulder, and defining an abutment surface for engaging the other of said at least two anti-friction bearings and urging the inner bearing races of said bearings toward one another; and
   an outer bearing race retainer coupled to said primary member adjacent to said inner bearing race retainer for urging the outer bearing race of one of said at least two anti-friction bearings toward the outer bearing race of the other of said anti-friction bearings.

6. A bearing lubrication delivery mechanism as defined by claim 1, wherein said means defining a lubricant flow path from said central lubricant reservoir to one side of said pair of anti-friction bearings comprises:
   a fluid conduit defined by said exterior sleeve surface and an interior surface of said bore;
   said at least two anti-friction bearings being located in said fluid conduit; and
   an end wall positioned adjacent to and spaced from said sleeve, said end wall section and said sleeve defining a radial flow path communicating with said central lubricant reservoir and said fluid conduit thereby allowing said lubricant to flow from said reservoir to said first side of said anti-friction bearings.

7. A bearing lubrication delivery mechanism as defined by claim 1, wherein said primary member is a flywheel.

8. A bearing lubrication delivery mechanism as defined by claim 1, further comprising a lubrication fitting coupled to said sleeve and defining an internal passage in fluid communication with said central lubricant reservoir to facilitate replenishment of said central lubricant reservoir with another charge of lubricant.

* * * * *